US006871180B1

(12) United States Patent
Neuhauser et al.

(10) Patent No.: US 6,871,180 B1
(45) Date of Patent: Mar. 22, 2005

(54) DECODING OF INFORMATION IN AUDIO SIGNALS

(75) Inventors: Alan R. Neuhauser, Silver Spring, MD (US); Wendell D. Lynch, Silver Spring, MD (US); James M. Jensen, Columbia, MD (US)

(73) Assignee: Arbitron Inc., Columbia, MD (US)

( * ) Notice: Subject to any disclaimer, the term of this patent is extended or adjusted under 35 U.S.C. 154(b) by 0 days.

(21) Appl. No.: 09/318,045

(22) Filed: May 25, 1999

(51) Int. Cl.$^{7}$ .......................... H04Q 11/04; H04N 9/00

(52) U.S. Cl. ........................ 704/500; 380/205; 725/14; 725/18

(58) Field of Search ................................ 704/500, 501, 704/502, 503, 200, 201, 205, 206, 270, 273; 380/201, 202, 205, 3, 4, 6; 348/1; 375/355, 362, 365, 366; 725/14, 18

(56) References Cited

U.S. PATENT DOCUMENTS

| | | | | |
|---|---|---|---|---|
| 2,470,240 | A | 5/1949 | Crosby | |
| 2,573,279 | A | 10/1951 | Scherbatskoy | |
| 2,630,525 | A | 3/1953 | Tomberlin et al. | |
| 2,660,662 | A | 11/1953 | Scherbatskoy | |
| 2,766,374 | A | 10/1956 | Hoffmann | |
| 3,004,104 | A | 10/1961 | Hembrooke | |
| 3,397,402 | A | 8/1968 | Schneider | |
| 3,492,577 | A | 1/1970 | Reiter et al. | |
| 3,760,275 | A | 9/1973 | Ohsawa et al. | |
| 3,803,349 | A | 4/1974 | Watanabe | |
| 3,845,391 | A | 10/1974 | Crosby | |
| 4,025,851 | A | 5/1977 | Haselwood et al. | |
| 4,225,967 | A | 9/1980 | Miwa et al. | |
| 4,230,990 | A | 10/1980 | Lert, Jr. et al. | |
| 4,238,849 | A | 12/1980 | Gassmann | |
| 4,425,642 | A | 1/1984 | Moses et al. | |
| 4,450,531 | A | 5/1984 | Kenyon et al. | |
| 4,547,804 | A | 10/1985 | Greenberg | |
| 4,599,732 | A * | 7/1986 | LeFever | 375/346 |
| 4,613,904 | A | 9/1986 | Lurie | |

(List continued on next page.)

FOREIGN PATENT DOCUMENTS

| | | |
|---|---|---|
| CA | 1 208 761 | 7/1986 |
| CA | 2036205 | 12/1991 |
| FR | 2559002 | 8/1985 |
| WO | WO 91/11062 | 7/1991 |
| WO | WO 93/07689 | 4/1993 |

OTHER PUBLICATIONS

Definition of Checksum. Webpedia.*

Definition of Checksum. SearchSecurity.*

Namba, Seiichi, et al., "A Program Identification Code Transmission System Using Low–Frequency Audio Signals"; NHK Laboratories Note; Ser. No. 314, Mar. 85.

*McGraw–Hill Encyclopedia of Science & Technology*, 6th Edition,, McGraw–Hill Book Company, 1987, vol. 8, pp. 328–341.

Rossing, *The Science of Sound*, Addison—Wesley Publishing Company, 1990, Chapters 5 and 6 (pp. 65–108) and section 16.4 (pp. 336–338).

Zwislocki , J.J. "Masking: Experimental and Theoretical Aspects . . . ", 1978, in Carterette, et al., ed., Handbook of Perception vol. IV, pp. 283–316, Academic Press, New York.

*Primary Examiner*—Richemond Dorvil
*Assistant Examiner*—Martin Lerner
(74) *Attorney, Agent, or Firm*—Cowan, Liebowitz & Latman, P.C.; Eugene L. Flanagan, III

(57) ABSTRACT

Systems and methods are provided for decoding a message symbol in an audio signal. This message symbol is represented by first and second code symbols displaced in time. Values representing the code signals are accumulated and the accumulated values are examined to detect the message symbol.

40 Claims, 10 Drawing Sheets

U.S. PATENT DOCUMENTS

| | | | | | |
|---|---|---|---|---|---|
| 4,618,995 | A | | 10/1986 | Kemp | |
| 4,626,904 | A | | 12/1986 | Lurie | |
| 4,639,779 | A | | 1/1987 | Greenberg | |
| 4,697,209 | A | | 9/1987 | Kiewit et al. | |
| 4,703,476 | A | | 10/1987 | Howard | |
| 4,718,106 | A | | 1/1988 | Weinblatt | |
| 4,805,020 | A | | 2/1989 | Greenberg | |
| 4,843,562 | A | | 6/1989 | Kenyon et al. | |
| 4,876,617 | A | | 10/1989 | Best et al. | |
| 4,943,973 | A | | 7/1990 | Werner | |
| 4,945,412 | A | | 7/1990 | Kramer | |
| 4,955,070 | A | | 9/1990 | Welsh et al. | |
| 4,967,273 | A | | 10/1990 | Greenberg | |
| 4,972,471 | A | | 11/1990 | Gross et al. | |
| 5,023,929 | A | | 6/1991 | Call | |
| 5,113,437 | A | | 5/1992 | Best et al. | |
| 5,213,337 | A | | 5/1993 | Sherman | |
| 5,319,735 | A | | 6/1994 | Preuss et al. | |
| 5,404,377 | A | | 4/1995 | Moses | |
| 5,425,100 | A | | 6/1995 | Thomas et al. | |
| 5,450,490 | A | | 9/1995 | Jensen et al. | |
| 5,526,427 | A | * | 6/1996 | Thomas et al. | 725/18 |
| 5,579,124 | A | | 11/1996 | Aijala et al. | |
| 5,764,763 | A | | 6/1998 | Jensen et al. | |
| 5,960,048 | A | * | 9/1999 | Haartsen | 375/366 |
| 6,005,598 | A | * | 12/1999 | Jeong | 348/460 |
| 6,519,769 | B1 | * | 2/2003 | Hopple et al. | 725/14 |
| 6,597,405 | B1 | * | 7/2003 | Iggulden | 348/553 |
| 6,647,548 | B1 | * | 11/2003 | Lu et al. | 725/20 |
| 6,675,383 | B1 | * | 1/2004 | Wheeler et al. | 725/19 |
| 6,735,775 | B1 | * | 5/2004 | Massetti | 725/14 |

* cited by examiner

FIG. 2

| INFORMATION SIGNAL | SYMBOL |
|---|---|
| COPYRIGHTED WORK | $S_1$ |
| AUTHOR | $S_2$ |
| BROADCASTING STATION | $S_3$ |
| DATE | $S_4$ |

FIG. 4

| FREQUENCY COMPONENT | SYMBOL | | | | | | | | | | |
|---|---|---|---|---|---|---|---|---|---|---|---|
| | $S_A$ | $S_B$ | $S_1$ | $S_2$ | $S_3$ | $S_4$ | • | • | • | $S_{N-1}$ | $S_N$ |
| 1 | $f_{1A}$ | $f_{1B}$ | $f_{11}$ | $f_{12}$ | $f_{13}$ | $f_{14}$ | • | • | • | $f_{1(N-1)}$ | $f_{1N}$ |
| 2 | $f_{2A}$ | $f_{2B}$ | $f_{21}$ | $f_{22}$ | $f_{23}$ | $f_{24}$ | • | • | • | $f_{2(N-1)}$ | $f_{2N}$ |
| 3 | $f_{3A}$ | $f_{3B}$ | $f_{31}$ | $f_{32}$ | $f_{33}$ | $f_{34}$ | • | • | • | $f_{3(N-1)}$ | $f_{3N}$ |
| 4 | $f_{4A}$ | $f_{4B}$ | $f_{41}$ | $f_{42}$ | $f_{43}$ | $f_{44}$ | • | • | • | $f_{4(N-1)}$ | $f_{4N}$ |
| • | • | • | • | • | • | • | • | • | • | • | • |
| • | • | • | • | • | • | • | • | • | • | • | • |
| • | • | • | • | • | • | • | • | • | • | • | • |
| N-1 | $f_{(M-1)A}$ | $f_{(M-1)B}$ | $f_{(M-1)1}$ | $f_{(M-1)2}$ | $f_{(M-1)3}$ | $f_{(M-1)4}$ | • | • | • | $f_{(M-1)(N-1)}$ | $f_{(M-1)N}$ |
| M | $f_{MA}$ | $f_{MB}$ | $f_{m1}$ | $f_{m2}$ | $f_{m3}$ | $f_{m4}$ | • | • | • | $f_{M(N-1)}$ | $f_{MN}$ |

100

DECODING OF INFORMATION IN AUDIO SIGNALS

BACKGROUND OF THE INVENTION

The present invention relates to methods and apparatus for extracting an information signal from an encoded audio signal.

There are various motivations to permanently or indelibly incorporate information signals into audio signals, referred to as "watermarking." Such an audio watermark may provide, for example, an indication of authorship, content, lineage, existence of copyright, or the like for the audio signals so marked. Alternatively, other information may be incorporated into audio signals either concerning the signal itself or unrelated to it. The information may be incorporated in an audio signal for various purposes, such as identification or as an address or command, whether or not related to the signal itself.

There is considerable interest in encoding audio signals with information to produce encoded audio signals having substantially the same perceptible characteristics as the original unencoded audio signals. Recent successful techniques exploit the psychoacoustic masking effect of the human auditory system whereby certain sounds are humanly imperceptible when received along with other sounds.

One particularly successful utilization of the psychoacoustic masking effect is described in U.S. Pat. No. 5,450,490 and U.S. Pat. No. 5,764,763 (Jensen et al.) in which information is represented by a multiple-frequency code signal which is incorporated into an audio signal based upon the masking ability of the audio signal. The encoded audio signal is suitable for broadcast transmission and reception as well as for recording and reproduction. When received the audio signal is then processed to detect the presence of the multiple-frequency code signal. Sometimes, only a portion of the multiple-frequency code signal, e.g., a number of single frequency code components, inserted into the original audio signal are detected in the received audio signal. If a sufficient quantity of code components is detected, the information signal itself may be recovered.

Generally, an acoustic signal having low amplitude levels will have only minimal capacity, if any at all, to acoustically mask an information signal. For example, such low amplitude levels can occur during a pause in a conversation, during an interlude between segments of music, or even within certain types of music. During a lengthy period of low amplitude levels, it may be difficult to incorporate a code signal in an audio signal without causing the encoded audio signal to differ from the original in an acoustically perceptible manner.

A further problem is the occurrence of burst errors during the transmission or reproduction of encoded audio signals. Burst errors may appear as temporally contiguous segments of signal error. Such errors generally are unpredictable and substantially affect the content of an encoded audio signal. Burst errors typically arise from failure in a transmission channel or reproduction device due to severe external interferences, such as an overlapping of signals from different transmission channels, an occurrence of system power spikes, an interruption in normal operations, an introduction of noise contamination (intentionally or otherwise), and the like. In a transmission system, such circumstances may cause a portion of the transmitted encoded audio signals to be entirely unreceivable or significantly altered. Absent retransmission of the encoded audio signal, the affected portion of the encoded audio may be wholly unrecoverable, while in other instances alterations to the encoded audio signal may render the embedded information signal undetectable. In many applications, such as radio and television broadcasting, real-time retransmission of encoded audio signals is simply unfeasible.

In systems for acoustically reproducing audio signals recorded on media, a variety of factors may cause burst errors in the reproduced acoustic signal. Commonly, an irregularity in the recording media, caused by damage, obstruction, or wear, results in certain portions of recorded audio signals being unreproducable or significantly altered upon reproduction. Also, misalignment of or interference with the recording or reproducing mechanism relative to the recording medium can cause burst-type errors during an acoustic reproduction of recorded audio signals. Further, the acoustic limitations of a speaker as well as the acoustic characteristics of the listening environment may result in spatial irregularities in the distribution of acoustic energy. Such irregularities may cause burst errors to occur in received acoustic signals, interfering with code recovery.

OBJECTS AND SUMMARY OF THE INVENTION

Therefore, an object of the present invention is to provide systems and methods for detecting code symbols in audio signals which alleviate the problems caused by periods of low signal levels and burst errors.

It is another object of the invention to provide such systems and methods which afford reliable operation under adverse conditions.

It is a further object of the invention to provide such systems and methods which are robust.

In accordance with an aspect of the present invention, systems and methods are provided for decoding at least one message symbol represented by a plurality of code symbols in an audio signal. The systems and methods comprise the means for and the steps of, respectively, receiving first and second code symbols representing a common message symbol, the first and second code symbols being displaced in time in the audio signal, accumulating a first signal value representing the first code symbol and a second signal value representing the second code symbol, and examining the accumulated first and second signal values to detect the common message symbol.

In accordance with another aspect of the present invention, a system is provided for decoding at least one message symbol represented by a plurality of code symbols in an audio signal. The system comprises, an input device for receiving first and second code symbols representing a common message symbol, the first and second code symbols being displaced in time in the audio signal; and a digital processor in communication with the input device to receive data therefrom representing the first and second code symbols, the digital processor being programmed to accumulate a first signal value representing the first code symbol and a second signal value representing the second code symbol, the digital processor being further programmed to examine the accumulated first and second signal values to detect the common message symbol.

In certain embodiments, the first and second signal values are accumulated by storing the values separately and the common message symbol is detected by examining both of the separately stored values. The first and second signal values may represent signal values derived from multiple other signal values, such as values of individual code frequency components, or a single signal value, such as a measure of the magnitude of a single code frequency component. Moreover, a derived value may be obtained as a linear combination of multiple signal values, such as a summation of weighted or unweighted values, or as a non-linear function thereof.

In further embodiments, the first and second signal values are accumulated by producing a third signal value derived from the first and second values. The third signal value in some embodiments is derived through a linear combination of the first and second signal values, such as a weighted or unweighted summation thereof, or as a nonlinear function thereof.

Other objects, features, and advantages according to the present invention will become apparent from the following detailed description of certain advantageous embodiments when read in conjunction with the accompanying drawings in which the same components are identified by the same reference numerals.

BRIEF DESCRIPTION OF THE DRAWINGS

FIG. 2 is a table to which reference will be made in explaining a methodology for encoding information in an audio signal;

FIG. 4 is another table to which reference will be made in explaining a methodology for encoding information in an audio signal;

DETAILED DESCRIPTION OF CERTAIN ADVANTAGEOUS EMBODIMENTS

The present invention relates to the use of especially robust encoding which converts information into redundant sequences of code symbols. In certain embodiments, each code symbol is represented by a set of different, predetermined single-frequency code signals; however, in other embodiments different code symbols may optionally share certain single-frequency code signals or may be provided by a methodology which does not assign predetermined frequency components to a given symbol. The redundant sequence of symbols is incorporated into the audio signals to produce encoded audio signals that are unnoticed by the listener but nevertheless recoverable.

The redundant code symbol sequence is especially suited for incorporation into audio signals having low masking capacity, such as audio signals having many low amplitude portions or the like. Additionally, when incorporated into audio signals, the redundant sequence of code symbols resists degradation by burst errors which affect temporally contiguous audio signals. As described hereinabove, such errors may be the result of imperfect audio signal recording, reproduction, and/or storage processes, transmission of the audio signals through a lossy and/or noisy channel, irregularities in an acoustic environment, or the like.

To recover the encoded information in certain advantageous embodiments, the encoded audio signals are examined in an attempt to detect the presence of predetermined single-frequency code components. During the encoding process, some single-frequency code components may not have been incorporated into the audio signals in certain signal intervals due to insufficient masking capacity in the audio signals in these intervals. Burst errors which have corrupted portions of the encoded audio signals can result in the deletion of certain code signals from the encoded audio signals or in the insertion of erroneous signals, such as noise, into the encoded audio signals. Thus, examination of the encoded audio signals is likely to reveal a much distorted version of the original sequence of sets of single-frequency code signals that represented the information.

The single-frequency code components that are recovered, along with the erroneous additional signals that are mistakenly detected as code signals, are processed to discern the original sequence of code symbols, if possible. The code signal detection and processing operations are specifically adapted to exploit the strengths of the encoding methodology. As a result, the detection and processing methodology of the present invention provides improved error tolerance.

Figure 1:
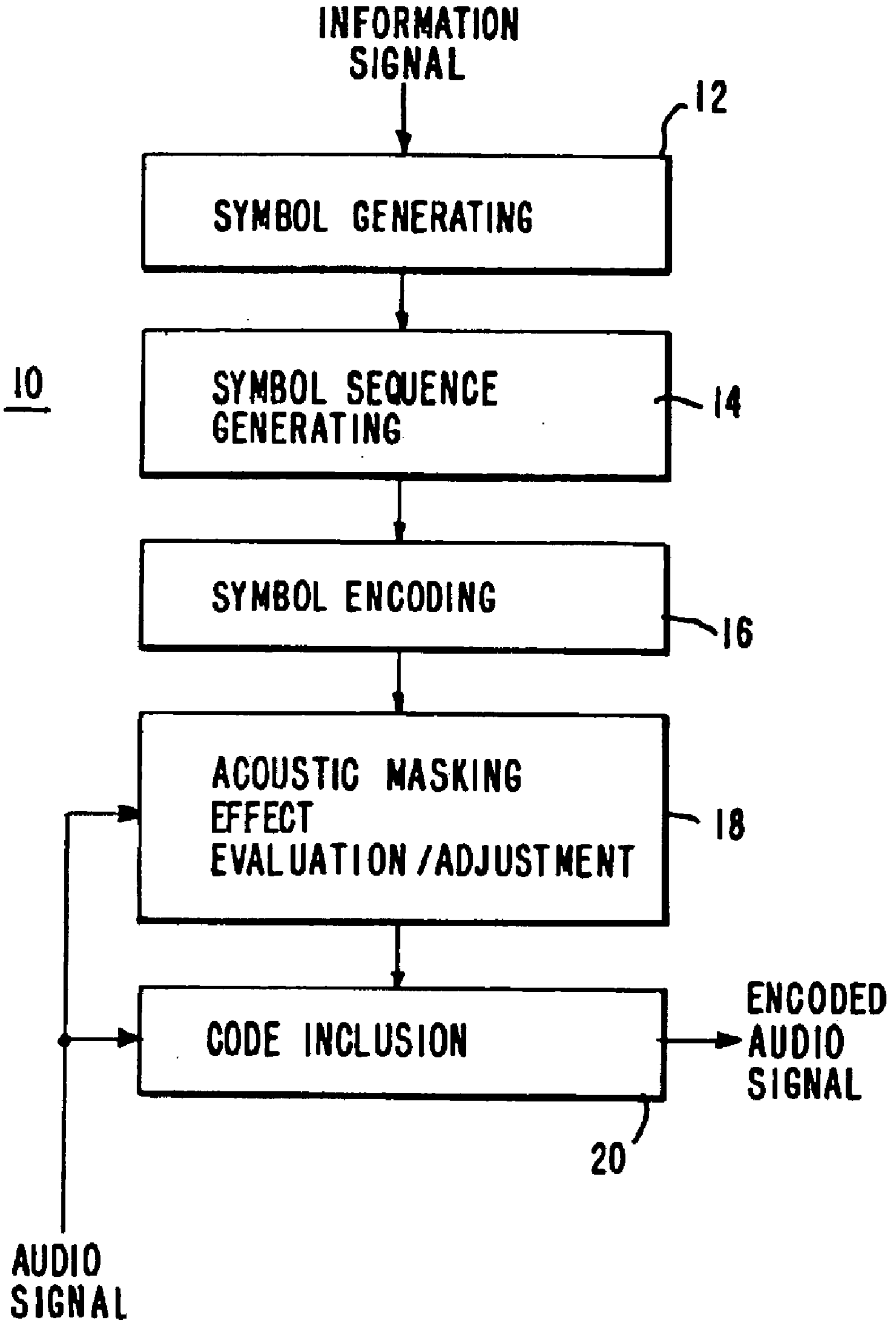
FIG. 1 is a functional block diagram of an encoding apparatus.

FIG. 1 is a functional block diagram of an audio signal encoder 10. Encoder 10 implements an optional symbol generation function 12, a symbol sequence generation function 14, a symbol encoding function 16, an acoustic masking effect evaluation/adjustment function 18, and an audio signal inclusion function 20. Preferably encoder 10 comprises a software-controlled computer system. The computer may be provided with an analog processor for sampling an analog audio signal to be encoded, or may input the audio signal directly in digital form, with or without resampling. Alternatively, encoder 10 may comprise one or more discrete signal processing components.

The symbol generation function 12, when employed, translates an information signal into a set of code symbols. This function may be carried out with the use of a memory device, such as a semiconductor EPROM of the computer system, which is prestored with a table of code symbols suitable for indexing with respect to an information signal. An example of a table for translating an information signal into a code symbol for certain applications is shown in FIG. 2. The table may be stored on a hard drive or other suitable storage device of the computer system. The symbol generation function may also be carried out by one or more discrete components, such as an EPROM and associated control devices, by a logic array, by an application specific integrated circuit, or any other suitable device or combination of devices. The symbol generation function may also be implemented by one or more devices which also implement one or more of the remaining functions illustrated in FIG. 1.

The symbol sequence generating function 14 formats the symbols produced by the symbol generating function (or input directly to the encoder 10) into a redundant sequence of code or information symbols. As part of the formatting process, in certain embodiments marker and/or synchronization symbols are added to the sequence of code symbols.

The redundant sequence of code symbols is designed to be especially resistant to burst errors and audio signal encoding processes. Further explanation of redundant sequences of code symbols in accordance with certain embodiments will be provided in connection with the discussion of FIGS. 3A, 3B, and 3C below. Preferably, the generating function 14 is implemented in a processing device, such as a microprocessor system, or by a dedicated formatting device, such as an application specific integrated circuit or a logic array, by a plurality of components or a combination of the foregoing. The symbol sequence generating function may also be implemented by one or more devices which also implement one or more of the remaining functions illustrated in FIG. 1.

As noted above, the symbol sequence generating function 14 is optional. For example, the encoding process may be carried out such that the information signal is translated directly into a predetermined symbol sequence, without implementing separate symbol generating and symbol sequence generating functions.

Each symbol of the sequence of symbols thus produced is converted by the symbol encoding function 16 into a plurality of single-frequency code signals. In certain advantageous embodiments the symbol encoding function is performed by means of a memory device of the computer system, such as a semiconductor EPROM, which is prestored with sets of single-frequency code signals that correspond to each symbol. An example of a table of symbols and corresponding sets of single-frequency code signals is shown in FIG. 4.

Alternatively, the sets of code signals may be stored on a hard drive or other suitable storage device of the computer system. The encoding function may also be implemented by one or more discrete components, such as an EPROM and associated control devices, by a logic array, by an application specific integrated circuit or any other suitable device or combination of devices. The encoding function may also be carried out by one or more devices which also implement one or more of the remaining functions illustrated in FIG. 1.

In the alternative, the encoded sequence may be generated directly from the information signal, without implementing the separate functions 12, 14, and 16.

The acoustic masking effect evaluation/adjustment function 18 determines the capacity of an input audio signal to mask single-frequency code signals produced by the symbol encoding function 16. Based upon a determination of the masking ability of the audio signal, the function 18 generates adjustment parameters to adjust the relative magnitudes of the single-frequency code signals so that such code signals will be rendered inaudible by a human listener when incorporated into the audio signal. Where the audio signal is determined to have low masking capacity, due to low signal amplitude or other signal characteristics, the adjustment parameters may reduce the magnitudes of certain code signals to extremely-low levels or may nullify such signals entirely. Conversely, where the audio signal is determined to have a greater masking capacity, such capacity may be utilized through the generation of adjustment parameters that increase the magnitudes of particular code signals. Code signals having increased magnitudes are generally more likely to be distinguishable from noise and thus detectable by a decoding device. Further details of certain advantageous embodiments of such evaluation/adjustment function are set forth in U.S. Pat. No. 5,764,763 and U.S. Pat. No. 5,450,490 to Jensen, et al., each entitled Apparatus and Methods for Including Codes in Audio Signals and Decoding, which are incorporated herein by reference in their entirety.

In certain embodiments, the function 18 applies the adjustment parameters to the single-frequency code signals to produce adjusted single-frequency code signals. The adjusted code signals are included in the audio signal by the function 20. Alternatively, the function 18 supplies the adjustment parameters along with the single-frequency code signals for adjustment and inclusion in the audio signal by the function 20. In still other embodiments, the function 18 is combined with one or more of the functions 12, 14, and 16 to produce magnitude-adjusted single-frequency code signals directly.

In certain embodiments, the acoustic masking effect evaluation/adjustment function 18 is implemented in a processing device, such as a microprocessor system which may also implement one or more of the additional functions illustrated in FIG. 1. The function 18 may also be carried out by a dedicated device, such as an application specific integrated circuit or a logic array, or by a plurality of discrete components, or a combination of the foregoing.

The code inclusion function 20 combines the single-frequency code components with the audio signal to produce an encoded audio signal. In a straightforward implementation, the function 20 simply adds the single-frequency code signals directly to the audio signal. However, the function 20 may overlay the code signals upon the audio signal. Alternatively, modulator 20 may modify the amplitudes of frequencies within the audio signal according to an input from acoustic masking effect evaluation function 18 to produce an encoded audio signal that includes the adjusted code signals. Moreover, the code inclusion function may be carried out either in the time domain or in the frequency domain. The code inclusion function 20 may be implemented by means of an adding circuit, or by means of a processor. This function may also be implemented by one or more devices described above which also implement one or more of the remaining functions illustrated in FIG. 1.

One or more of the functions 12 through 20 may be implemented by a single device. In certain advantageous embodiments, the functions 12, 14, 16 and 18 are implemented by a single processor, and in still others a single processor carries out all of the functions illustrated in FIG. 1. Moreover, two or more of the functions 12, 14, 16 and 18 may be implemented by means of a single table maintained in an appropriate storage device.

FIG. 2 illustrates an exemplary translation table for converting an information signal into a code symbol. As shown, an information signal may comprise information regarding the content of, the characteristics of, or other considerations relating to a particular audio signal. For example, it is contemplated that an audio signal could be modified to include an inaudible indication that copyright is claimed in the audio program. Correspondingly, a symbol, such as $S_1$, may be utilized to indicate that copyright is claimed in the particular work. Similarly, an author may be identified with a unique symbol $S_2$ or a broadcasting station identified with a unique symbol $S_3$. Further, a particular date could be represented by a symbol $S_4$. Of course many other types of information could be included in an information signal and translated into a symbol. For example, information such as addresses, commands, encryption keys, etc., may be encoded in such symbols. Alternatively, sets or sequences of symbols, in addition to or instead of individual symbols, may be utilized to represent particular types of information. As another alternative, an entire symbolic language may be implemented to represent any type of information signal. Also, the encoded information need not be related to the audio signal.

Figure 3A:
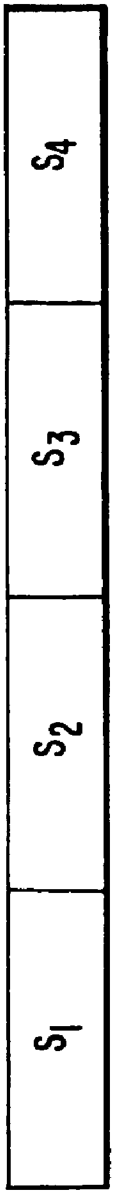
FIGS. 3A, 3B, and 3C are schematic diagrams which illustrate an audio signal encoding methodology.
Figure 3B:
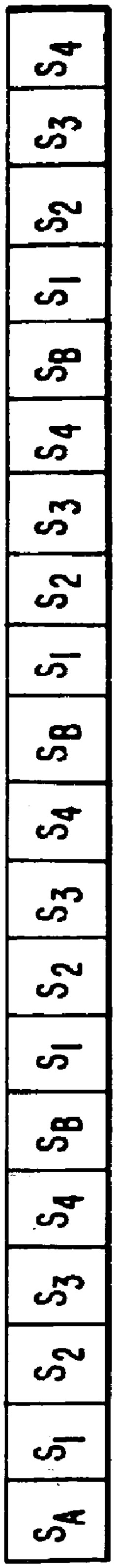
Figure 3C:
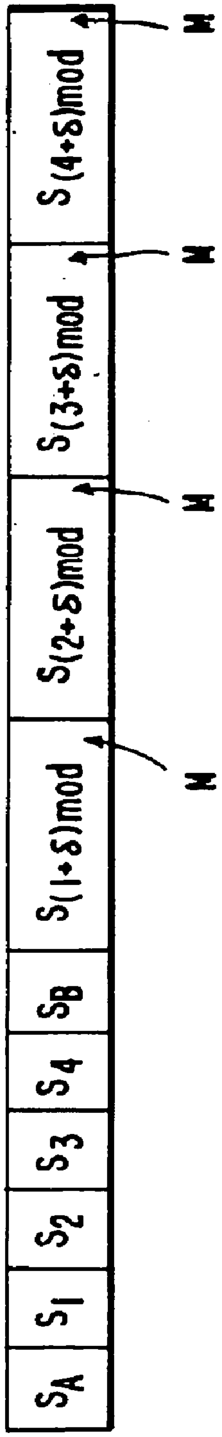

FIG. 3A is a schematic diagram illustrating a stream of symbols which might be generated by the symbol generating function 12 of FIG. 1, while FIGS. 3B and 3C are schematic diagrams illustrating sequences of symbols which might be generated by the symbol sequence generating function 14 of FIG. 1 in response to the symbol stream of FIG. 3A. In FIGS. 3A through 3C, $S_1$, $S_2$, $S_3$, and $S_4$ are used as examples of symbols to illustrate features of the present invention and are not meant to limit its applicability. For example, the information represented by any one or more of the symbols $S_1$, $S_2$, $S_3$ or $S_4$ may be selected arbitrarily without regard to that represented by any one or more of the other symbols.

FIG. 3B illustrates an example of a core unit of a redundant symbol sequence representative of an input set of four symbols, $S_1$, $S_2$, $S_3$, and $S_4$. The core unit begins with a first message segment having sequence or marker symbol, $S_A$, followed by the four input data symbols, followed by three repeating message segments each comprised of a sequence or marker symbol, $S_B$, and the four input symbols. For many applications, this core unit alone is sufficiently redundant to provide the required level of survivability. Alternatively, this core unit may itself be repeated to increase survivability. Moreover, the core unit may have more or less than four message segments, as well as segments having more or less than four or five symbols.

Generalizing from this example, an input set of N symbols, $S_1$, $S_2$, $S_3$, . . . , $S_{N-1}$, $S_N$, is represented by the redundant symbol sequence comprising $S_A$, $S_1$, $S_2$, $S_3$, . . . $S_{N-1}$, $S_N$, followed by (P−1) repeating segments comprising $S_B$, $S_1$, $S_2$, $S_3$, . . . $S_{N-1}$, $S_N$. As in the example, this core unit may itself be repeated to increase survivability. In addition, the sequence of symbols in the message segments may be varied from segment to segment so long as the decoder is arranged to recognize corresponding symbols in the various segments. Moreover, different sequence or marker symbols and combinations thereof may be employed, and the positions of the markers with respect to the data symbols may be arranged differently. For example, the sequence can take the form, $S_1$ . . . , $S_2$, . . . , $S_A$, . . . , $S_N$ or the form, $S_1$, $S_2$, . . . , $S_N$, $S_A$.

FIG. 3C illustrates an example of an advantageous core unit of a redundant symbol sequence representative of an input set of four data symbols, $S_1$, $S_2$, $S_3$, and $S_4$. The core unit begins with a sequence or marker symbol, $S_A$, followed by the four input data symbols, followed by a sequence or marker symbol, $S_B$, followed by $S_{(1+\delta)}$ mod M, $S_{(2+\delta)}$ mod M, $S_{(3+\delta)}$ mod M, $S_{(4+\delta)}$ mod M, where M is the number of different symbols in the available symbol set and where δ is an offset having a value between Ø and M. In an advantageous embodiment, the offset δ is selected as a CRC checksum. In still other embodiments, the value of the offset δ is varied from time to time to encode additional information in the message. For example, if the offset can vary from 0 to 9, nine different information states can be encoded in the offset.

Generalizing from this example, an input set of N symbols, $S_1$, $S_2$, $S_3$, . . . $S_{N-1}$, $S_N$, is represented by the redundant symbol sequence comprising $S_A$, $S_1$, $S_2$, $S_3$, . . . $S_{N-1}$, $S_N$, $S_B$, $S_{(1+\delta)}$ mod M, $S_{(2+\delta)}$ mod M, $S_{(3+\delta)}$ mod M, . . . $S_{(N-1+\delta)}$ mod M, $S_{(N+\delta)}$mod M. That is, the same information is represented by two or more different symbols in the same core unit and recognized according to their order therein. In addition, these core units may themselves be repeated to increase survivability. Since the same information is represented by multiple different symbols, the coding is made substantially more robust. For example, the structure of an audio signal can mimic the frequency component of one of the data symbols $S_N$, but the likelihood that the audio signal will also mimic its corresponding offset $S_{(N+\delta)}$ mod M at its predetermined occurrence is very much lower. Also, since the offset is the same for all symbols within a given segment, this information provides a further check on the validity of the detected symbols within that segment. Consequently, the encoding format of FIG. 3C substantially reduces the likelihood of false detections induced by the structure of the audio signal.

A particular strength of the redundant sequence exemplified in FIG. 3 is its utilization of the input symbols in their original order followed by (a) a different arrangement of the input symbols, (b) an arrangement of symbols that includes other symbols in place of one or more of the input symbols, with or without rearrangement of input symbol order, or (c) an arrangement of symbols different from the input symbols. Arrangements (b) and (c) are particularly robust since, upon symbol encoding, an increased diversity of single-frequency code signals is achieved. Assuming that the input symbols are encoded collectively from among a first group of code signals, symbols in arrangements (b) and (c) will be encoded with another group of code signals which to some extent does not overlap the first group. A greater diversity of code signals will generally increase the likelihood that some code signals are within the masking capacity of the audio signal.

The table of FIG. 4 illustrates an exemplary conversion for a sequence or marker symbol, $S_A$, a sequence or marker symbol, $S_B$, and N data symbols, $S_1$, $S_2$, $S_3$, . . . , $S_{N-1}$, $S_N$, into corresponding sets of M single-frequency code signals $f_{1x}$, $f_{2x}$, $f_{3x}$, . . . , $f_{[M-1]x}$, $f_{Mx}$, where x references the identifying subscript of the particular symbol. Although the single-frequency code signals may occur throughout the frequency range of the audio signal and, to some extent, outside such frequency range, the code signals of this embodiment are within the frequency range 500 Hz to 5500 Hz but may be selected as a different frequency range. In one embodiment, the sets of M single-frequency code signals may share certain single-frequency code signals; however, in a preferred embodiment, the single-frequency code signals are completely non-overlapping. Moreover, it is not necessary that all symbols be represented by the same number of frequency components.

Figure 5:
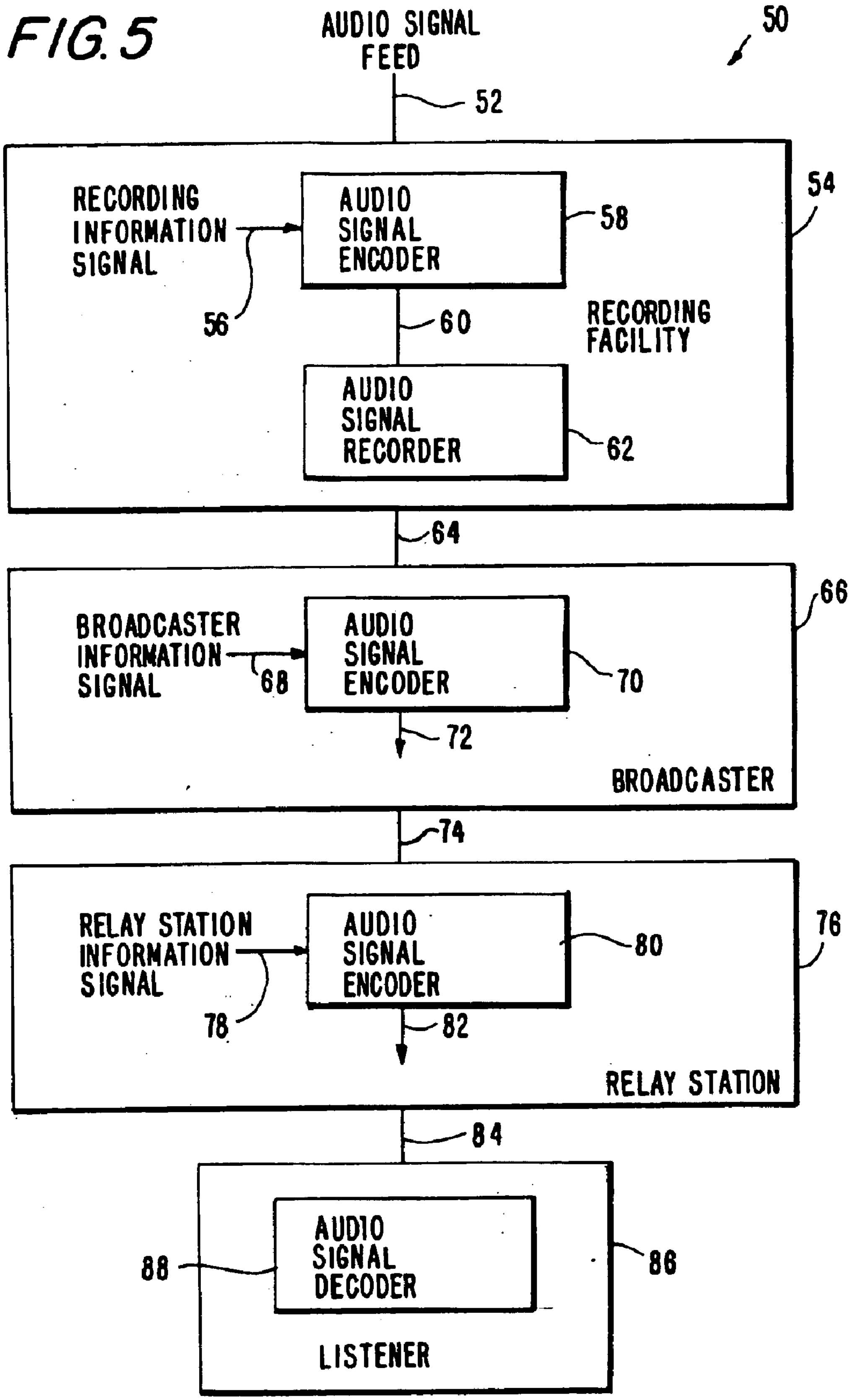
FIG. 5 is a block diagram illustrating a multiple-stage audio signal encoding system.

FIG. 5 illustrates a multiple-stage audio signal encoding system 50. This system implements multiple audio signal encoders to successively encode an audio signal 52 as it travels along a typical audio signal distribution network. At each stage of distribution, the audio signal is successively encoded with an information signal pertinent to the particular stage. Preferably, the successive encodings of the respective information signals do not produce code signals that overlap in frequency. Nevertheless, due to the robust nature of the encoding methodology, partial overlap among the frequency components of the respective encoded information signals is tolerable. System 50 includes a recording facility 54; a broadcaster 66; a relay station 76; audio signal encoders 58, 70, and 80; an audio signal recorder 62; a listener facility 86; and an audio signal decoder 88.

Recording facility 54 includes apparatus for receiving and encoding audio signals and recording encoded audio signals upon a storage medium. Specifically, facility 54 includes audio signal encoder 58 and audio signal recorder 62. Audio signal encoder 58 receives an audio signal feed 52 and a recording information signal 56 and encodes audio signal 52 with information signal 56 to produce an encoded audio signal 60. Audio signal feed 52 may be produced by any conventional source of audio signals such as a microphone, an apparatus for reproducing recorded audio signals, or the like. Recording information signal 56 preferably comprises information regarding audio signal feed 52, such as its authorship, content, or lineage, or the existence of copyright, or the like. Alternatively, recording information signal 56 may comprise any type of data.

Recorder 62 is a conventional device for recording encoded audio signals 60 upon a storage medium which is suitable for distribution to one or more broadcasters 66. Alternatively, audio signal recorder 62 may be omitted entirely. Encoded audio signals 60 may be distributed via distribution of the recorded storage media or via a communication link 64. Communication link 64 extends between recording facility 54 and broadcaster 66 and may comprise a broadcast channel, a microwave link, a wire or fiber optic connection, or the like.

Broadcaster 66 is a broadcasting station that receives encoded audio signals 60, further encodes such signals 60 with a broadcaster information signal 68 to produce a twice-encoded audio signal 72, and broadcasts the twice-encoded audio signal 72 along a transmission path 74. Broadcaster 66 includes an audio signal encoder 70 which receives encoded audio signal 60 from recording facility 54 and a broadcaster information signal 68. Broadcaster information signal 68 may comprise information regarding broadcaster 66, such as an identification code, or regarding the broadcasting process, such as the time, date or characteristics of the broadcast, the intended recipient(s) of the broadcast signal, or the like. Encoder 70 encodes encoded audio signal 60 with information signal 68 to produce twice-encoded audio signal 72. Transmission path 74 extends between broadcaster 66 and relay station 76 may comprise a broadcast channel, a microwave link, a wire or fiber optic connection, or the like.

Relay station 76 receives a twice-encoded audio signal 72 from broadcaster 66, further encodes that signal with a relay station information signal 78, and transmits the thrice-encoded audio signal 82 to a listener facility 86 via a transmission path 84. Relay station 76 includes an audio signal encoder 80 which receives twice-encoded audio signal 72 from broadcaster 66 and a relay station information signal 78. Relay station information signal 78 preferably comprises information regarding relay station 76, such as an identification code, or regarding the process of relaying the broadcast signal, such as the time, date or characteristics of the relay, the intended recipient(s) of the relayed signal, or the like. Encoder 80 encodes twice-encoded audio signal 72 with relay station information signal 78 to produce thrice-encoded audio signal 82. Transmission path 84 extends between relay station 76 and listener facility 86 and may comprise a broadcast channel, a microwave link, a wire or fiber optic connection, or the like. Optionally, transmission path 84 may be an acoustic transmission path.

Listener facility 86 receives thrice-encoded audio signal 82 from relay station 76. In audience estimate applications, listener facility 86 is located where a human listener may perceive an acoustic reproduction of audio signal 82. If audio signal 82 is transmitted as an electromagnetic signal, listener facility 86 preferably includes a device for acoustically reproducing that signal for the human listener. However, if audio signal 82 is stored upon a storage medium, listener facility 86 preferably includes a device for reproducing signal 82 from the storage medium.

In other applications, such as music identification and commercial monitoring, a monitoring facility is employed rather than listener 86. In such a monitoring facility, the audio signal 82 preferably is processed to receive the encoded message without acoustic reproduction.

Audio signal decoder 88 may receive thrice encoded audio signal 82 as an audio signal or, optionally, as an acoustic signal. Decoder 88 decodes audio signal 82 to recover one or more of the information signals encoded therein. Preferably, the recovered information signal(s) are processed at listener facility 86 or recorded on a storage medium for later processing.

Alternatively, the recovered information signal(s) may be converted into images for visual display to the listener.

In an alternate embodiment, recording facility 54 is omitted from system 50. Audio signal feed 52, representing, for example, a live audio performance, is provided directly to broadcaster 66 for encoding and broadcast. Accordingly, broadcaster information signal 68 may further comprise information regarding audio signal feed 52, such as its authorship, content, or lineage, or the existence of copyright, or the like.

In another alternate embodiment, relay station 76 is omitted from system 50. Broadcaster 66 provides twice-encoded audio signal 72 directly to listener 86 via transmission path 74 which is modified to extend therebetween. As a further alternative, both recording facility 54 and relay station 76 may be omitted from system 50.

In another alternate embodiment, broadcaster 66 and relay station 76 are omitted from system 50. Optionally, communication link 64 is modified to extend between recording facility 54 and listener facility 86 and to carry encoded audio signal 60 therebetween. Preferably, audio signal recorder 62 records encoded audio signal 60 upon a storage medium which is thereafter conveyed to listener facility 86. An optional reproduction device at listener facility 86 reproduces the encoded audio signal from the storage medium for decoding and/or acoustic reproduction.

Figure 6:
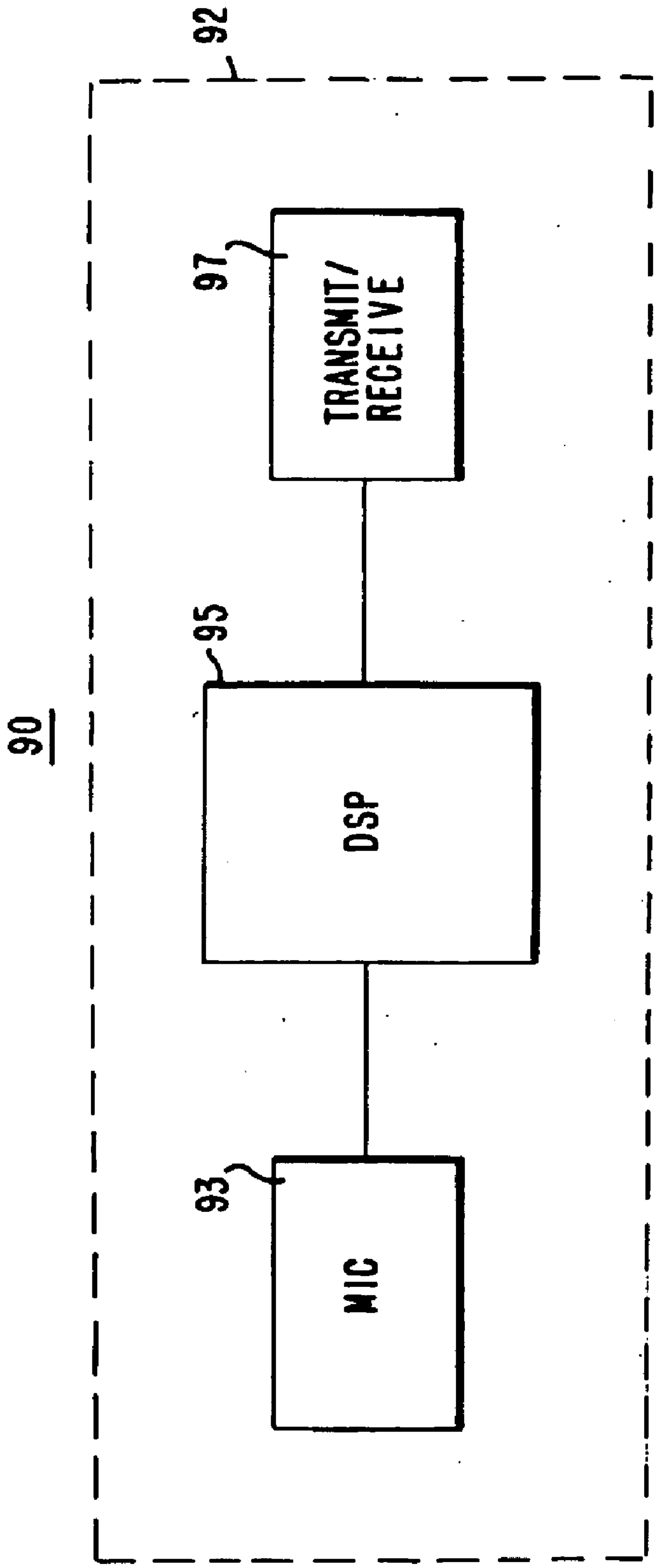
FIG. 6 is a functional block diagram of a personal portable meter.

FIG. 6 provides an example of a personal portable meter 40 for use in audience estimate applications. The meter 90 includes a housing 92, illustrated in phantom lines, having a size and shape permitting it to be carried on the person of an audience member. For example, the housing may have the same size and shape as a pager unit.

A microphone 93 is within the housing 92 and serves as an acoustic transducer to transduce received acoustic energy, including encoded audio signals, to analog electrical signals. The analog signals are converted to digital by an analog to digital converter and the digital signals are then supplied to a digital signal processor (DSP) 95. The DSP 95 implements a decoder in accordance with the present invention in order to detect the presence of predetermined codes in the audio energy received by the microphone 93 indicating that the person carrying the personal portable meter 90 has been exposed to a broadcast of a certain station or channel. If so, the DSP 95 stores a signal representing such detection in its internal memory along with an associated time signal.

The meter 90 also includes a data transmitter/receiver, such as an infrared transmitter/receiver 97 coupled with the DSP 95. The transmitter/receiver 97 enables the DSP 95 to provide its data to a facility for processing such data from multiple meters 90 to produce audience estimates, as well as to receive instructions and data, for example, to set up the meter 90 for carrying out a new audience survey.

Figure 7:
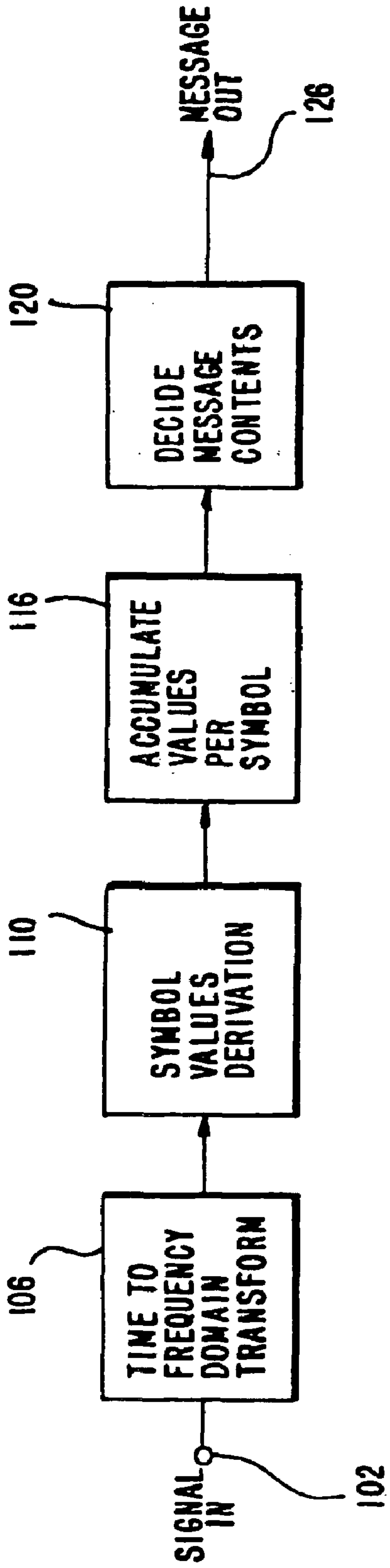
FIG. 7 is a functional block diagram illustrating a decoding apparatus.

Decoders in accordance with certain advantageous embodiments of the present invention are illustrated by the functional block diagram of FIG. 7. An audio signal which may be encoded as described hereinabove with a plurality of code symbols, is received at an input 102. The received audio signal may be a broadcast, internet or otherwise communicated signal, or a reproduced signal. It may be a direct coupled or an acoustically coupled signal. From the following description in connection with the accompanying drawings, it will be appreciated that the decoder 100 is capable of detecting codes in addition to those arranged in the formats disclosed hereinabove.

For received audio signals in the time domain, the decoder 100 transforms such signals to the frequency domain by means of a function 106. The function 106 preferably is performed by a digital processor implementing a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, the function 106 may also be carried out by analog or digital filters, by an application specific integrated circuit, or any other suitable device or combination of devices. The function 106 may also be implemented by one or more devices which also implement one or more of the remaining functions illustrated in FIG. 7.

The frequency domain-converted audio signals are processed in a symbol values derivation function 110, to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values.

The function 110 may be carried out by a digital processor, such as a digital signal processor (DSP) which advantageously carries out some or all of the other functions of decoder 100. However, the function 110 may also be carried out by an application specific integrated circuit, or by any other suitable device or combination of devices, and may be implemented by apparatus apart from the means which implement the remaining functions of the decoder 100.

The stream of symbol values produced by the function 110 are accumulated over time in an appropriate storage device on a symbol-by-symbol basis, as indicated by the function 116. In particular, the function 116 is advantageous for use in decoding encoded symbols which repeat periodically, by periodically accumulating symbol values for the various possible symbols. For example, if a given symbol is expected to recur every X seconds, the function 116 may serve to store a stream of symbol values for a period of nX seconds (n>1), and add to the stored values of one or more symbol value streams of nX seconds duration, so that peak symbol values accumulate over time, improving the signal-to-noise ratio of the stored values.

The function 116 may be carried out by a digital processor, such as a DSP, which advantageously carries out some or all of the other functions of decoder 100. However, the function 110 may also be carried out using a memory device separate from such a processor, or by an application specific integrated circuit, or by any other suitable device or combination of devices, and may be implemented by apparatus apart from the means which implements the remaining functions of the decoder 100.

The accumulated symbol values stored by the function 116 are then examined by the function 120 to detect the presence of an encoded message and output the detected message at an output 126. The function 120 can be carried out by matching the stored accumulated values or a processed version of such values, against stored patterns, whether by correlation or by another pattern matching technique. However, the function 120 advantageously is carried out by examining peak accumulated symbol values and their relative timing, to reconstruct their encoded message. This function may be carried out after the first stream of symbol values has been stored by the function 116 and/or after each subsequent stream has been added thereto, so that the message is detected once the signal-to-noise ratios of the stored, accumulated streams of symbol values reveal a valid message pattern.

Figure 8:
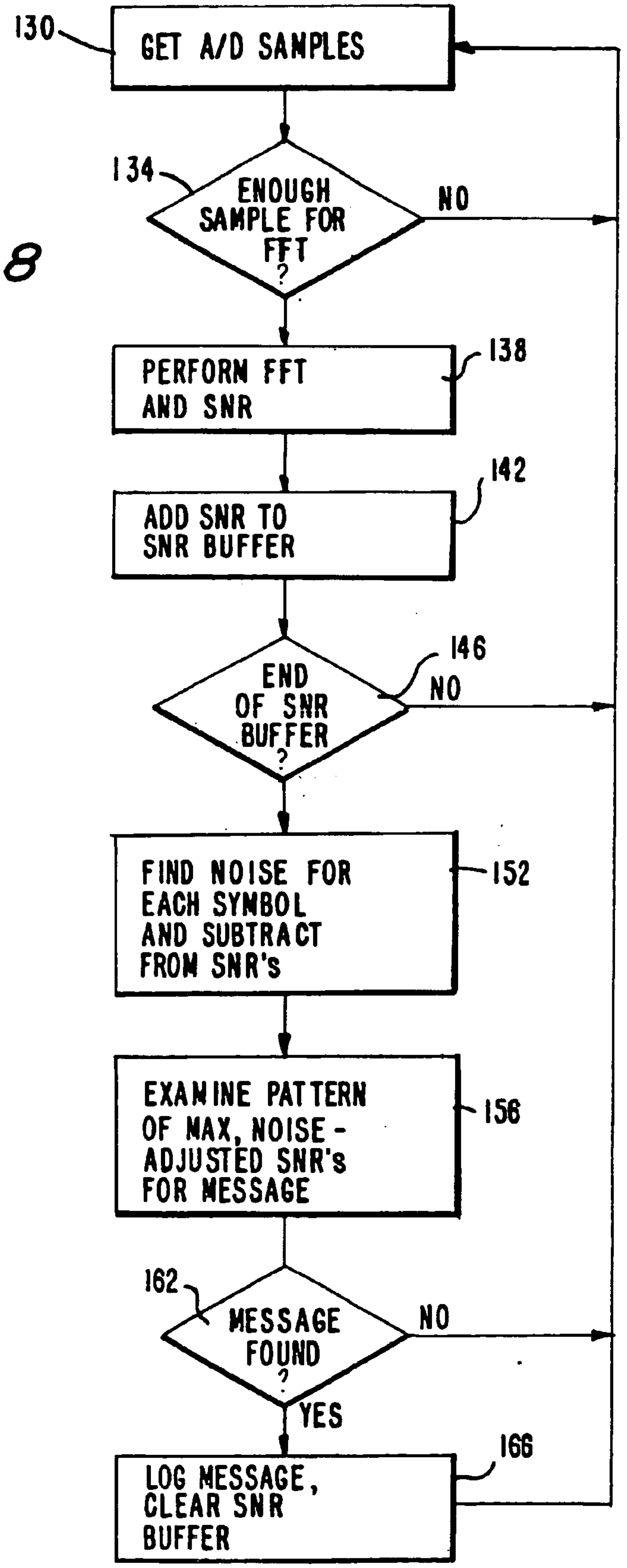
FIG. 8 is a flowchart illustrating a methodology for retrieving an information code from an encoded audio signal.

FIG. 8 is a flow chart for a decoder according to one advantageous embodiment of the invention implemented by means of a DSP. Step 130 is provided for those applications in which the encoded audio signal is received in analog form, for example, where it has been picked up by a microphone (as in FIG. 6 embodiment) or an RF receiver.

The decoder of FIG. 8 is particularly well adapted for detecting code symbols each of which includes a plurality of predetermined frequency components, e.g. ten components, within a frequency range of 1000 Hz to 3000 Hz. It is designed specifically to detect a message having the sequence illustrated in FIG. 3C wherein each symbol occupies an interval of one half-second. In this exemplary embodiment, it is assumed that the symbol set consists of twelve symbols, each having ten predetermined frequency components, none of which is shared with any other symbol of the symbol set. It will be appreciated that the FIG. 8 decoder may readily be modified to detect different numbers of code symbols, different numbers of components, different symbol sequences and symbol durations, as well as components arranged in different frequency bands.

In order to separate the various components, the DSP repeatedly carries out FFTs on audio signal samples falling within successive, predetermined intervals. The intervals may overlap, although this is not required. In an exemplary embodiment, ten overlapping FFT's are carried out during each second of decoder operation. Accordingly, the energy of each symbol period falls within five FFT periods. The FFT's may be windowed, although this may be omitted in order to simplify the decoder. The samples are stored and, when a sufficient number are thus available, a new FFT is performed, as indicated by steps 134 and 138.

In this embodiment, the frequency component values are produced on a relative basis. That is, each component value is represented as a signal-to-noise ratio (SNR), produced as follows. The energy within each frequency bin of the FFT in which a frequency component of any symbol can fall provides the numerator of each corresponding SNR Its denominator is determined as an average of adjacent bin values. For example, the average of seven of the eight surrounding bin energy values may be used, the largest value of the eight being ignored in order to avoid the influence of a possible large bin energy value which could result, for example, from an audio signal component in the neighborhood of the code frequency component. Also, given that a large energy value could also appear in the code component bin, for example, due to noise or an audio signal component, the SNR is appropriately limited. In this embodiment, if SNR=>6.0, then SNR is limited to 6.0, although a different maximum value may be selected.

Figure 9:
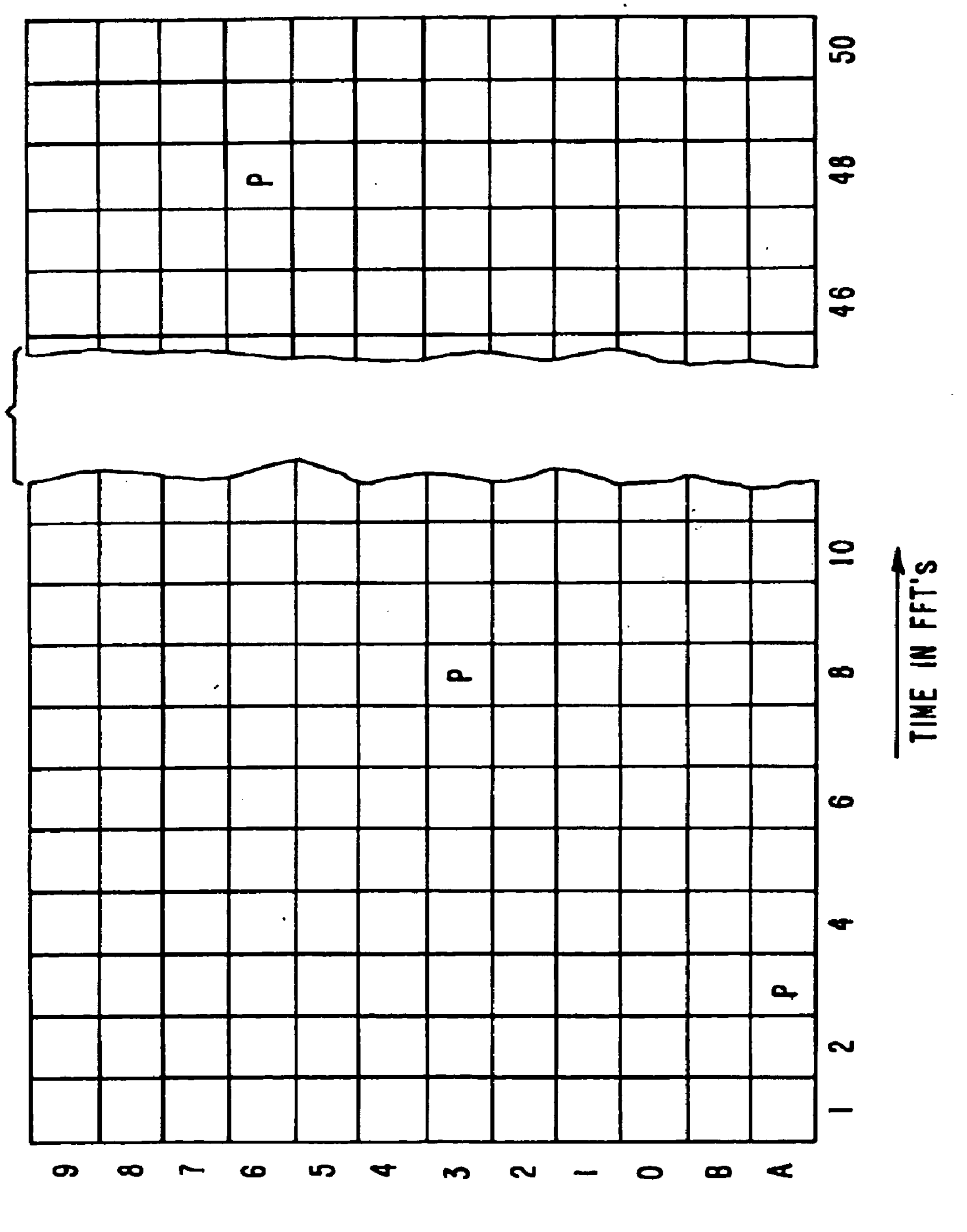
FIG. 9 is a schematic diagram of a circular SNR buffer used in carrying out the methodology of FIG. 8.

The ten SNR's of each FFT and corresponding to each symbol which may be present, are combined to form symbol SNR's which are stored in a circular symbol SNR buffer, as indicated in step 142 and illustrated schematically in FIG. 9. In certain embodiments, the ten SNR's for a symbol are simply added, although other ways of combining the SNR's may be employed.

As indicated by FIG. 9, the symbol SNR's for each of the twelve symbols A, B and 0–9, are stored in the symbol SNR buffer as separate sequences, one symbol SNR for each FFT for 50 μl FFT's. After the values produced in the 50 FFT's have been stored in the symbol SNR buffer, new symbol SNR's are combined with the previously stored values, as described below.

When the symbol SNR buffer is filled, this is detected in a step 146. In certain advantageous embodiments, the stored SNR's are adjusted to reduce the influence of noise in a step 152, although this step is optional in many applications. In this optional step, a noise value is obtained for each symbol (row) in the buffer by obtaining the average of all stored symbol SNR's in the respective row each time the buffer is filled. Then, to compensate for the effects of noise, this average or "noise" value is subtracted from each of the stored symbol SNR values in the corresponding row. In this manner, a "symbol" appearing only briefly, and thus not a valid detection, is averaged out over time. Referring also to FIG. 3C, in order to avoid inflating the noise value at the decoder, preferably the encoding scheme is constrained so that the same symbol does not appear twice in the first half of the message (i.e., within symbol sequence $S_A$, $S_1$, $S_2$, $S_3$, $S_4$).

After the symbol SNR's have been adjusted by subtracting the noise level, the decoder attempts to recover the message by examining the pattern of maximum SNR values in the buffer in a step 156. In certain embodiments, the maximum SNR values for each symbol are located in a process of successively combining groups of five adjacent SNR's, by weighting the values in the sequence in proportion to the sequential weighting (6 10 10 10 6) and then adding the weighted SNR's to produce a comparison SNR centered in the time period of the third SNR in the sequence. This process is carried out progressively throughout the fifty FFT periods of each symbol. For example, a first group of five SNR's for the "A" symbol in FFT periods 1 through 5 are weighted and added to produce a comparison SNR for FFT period 3. Then a further comparison SNR is produced using the SNR's from FFT periods 2–6, and so on until comparison values have been obtained centered on FFT periods 3 through 48. However, other means may be employed for recovering the message. For example, either more or less than five SNR's may be combined, they may be combined without weighing, or they may be combined in a non-linear fashion.

After the comparison SNR values have been obtained, the decoder examines the comparison SNR values for a message pattern. First, the marker code symbols $S_A$ and $S_B$ are located. Once this information is obtained, the decoder attempts to detect the peaks of the data symbols. The use of a predetermined offset between each data symbol in the first segment and the corresponding data symbol in the second segment provides a check on the validity of the detected message. That is, if both markers are detected and the same offset is observed between each data symbol in the first segment and its corresponding data symbol in the second segment, it is highly likely that a valid message has been received.

With reference both to FIGS. 3C and 9, assuming that the beginning of the buffer corresponds with the beginning of the message (which usually is not the case), a peak P of the comparison SNR's for the "A" symbol should appear in the third FFT period, as indicated. Then the decoder will expect the next peak to appear in the position corresponding to the first data symbol 0–9 in the eighth FFT period. In this example, it is assumed that the first data symbol is "3". If the last data symbol is "4" and the value of 6 is 2, the decoder will find a peak of the symbol "6" in FFT period 48, as indicated in FIG. 9. If the message is thus detected (i.e., markers detected with data symbols appearing where expected and with the same offset throughout), as indicated in steps 162 and 166, the message is logged or output and the SNR buffer is cleared.

However, if the message is not thus found, a further fifty overlapping FFT's are carried out on the following portions of the audio signal and the symbol SNR's so produced are added to those already in the circular buffer. The noise adjustment process is carried out as before and the decoder attempts to detect the message pattern again. This process is repeated continuously until a message is detected. In the alternative, the process may be carried out a limited number of times.

It will be apparent from the foregoing to modify the operation of the decoder depending on the structure of the message, its timing, its signal path, the mode of its detection, etc., without departing from the scope of the present invention. For example, in place of storing SNR's, FFT results may be stored directly for detecting a message.

Figure 10:
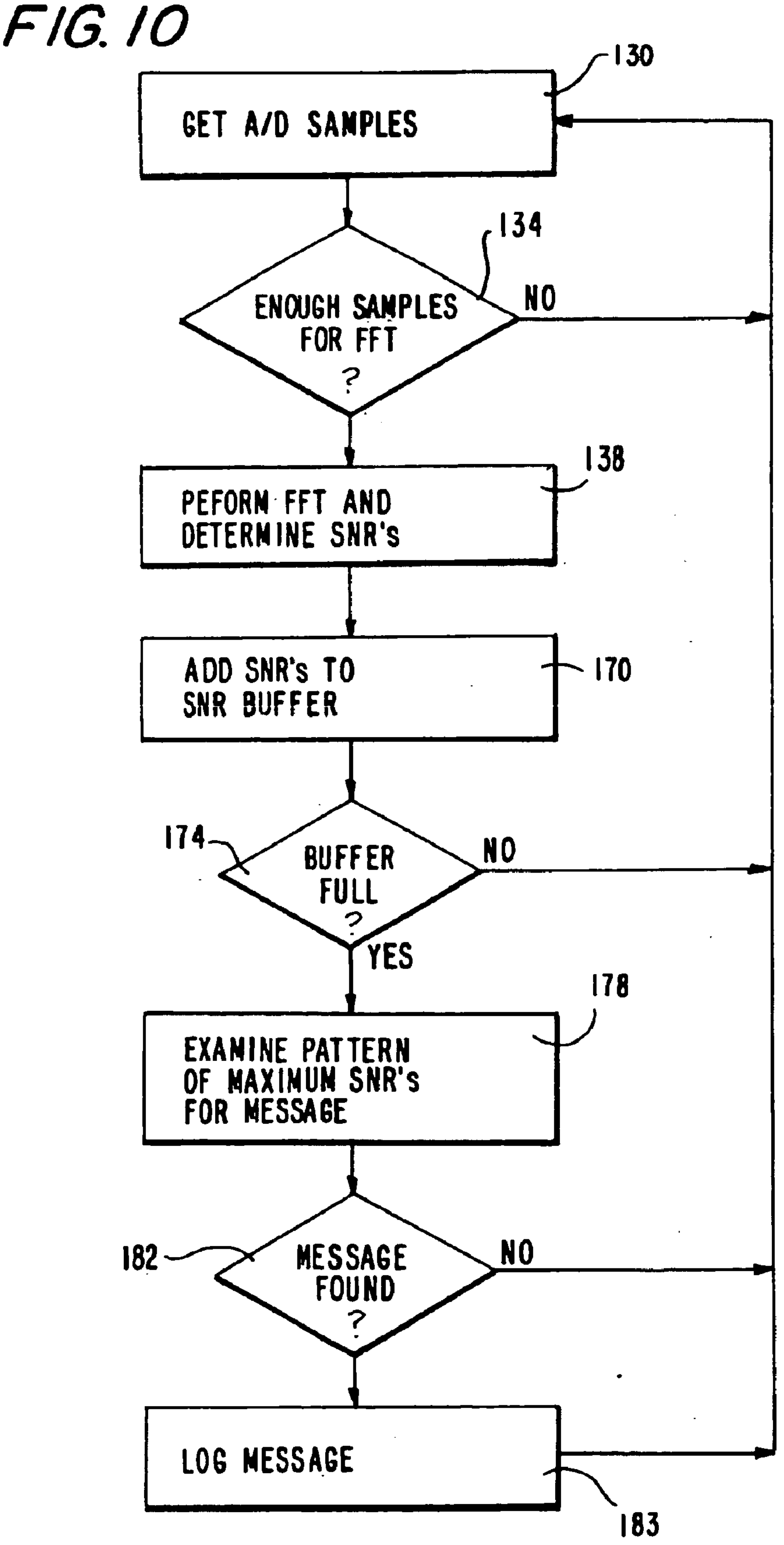
FIG. 10 is a flow chart illustrating another methodology for retrieving an information code from an encoded audio signal.

FIG. 10 is a flow chart for another decoder according to a further advantageous embodiment likewise implemented by means of a DSP. The decoder of FIG. 10 is especially adapted to detect a repeating sequence of five code symbols consisting of a marker symbol followed by four data symbols wherein each of the code symbols includes a plurality of predetermined frequency components and has a duration of one-half second in the message sequence. It is assumed that each symbol is represented by ten unique frequency components and that the symbol set includes twelve different symbols A, B and 0–9, as in the code of FIG. 3C. However, the FIG. 9 embodiment may readily be modified to detect any number of symbols, each represented by one or more frequency components.

Steps employed in the decoding process illustrated in FIG. 10 which correspond to those of FIG. 8 are indicated by the same reference numerals, and these steps consequently are not further described. The FIG. 10 embodiment uses a circular buffer which is twelve symbols wide by 150 FFT periods long. Once the buffer has been filled, new symbol SNRs each replace what are than the oldest symbol SNR values. In effect, the buffer stores a fifteen second window of symbol SNR values.

As indicated in step 174, once the circular buffer is fill, its contents are examined in a step 178 to detect the presence of the message pattern. Once full, the buffer remains full continuously, so that the pattern search of step 178 may be carried out after every FFT.

Since each five symbol message repeats every 2½ seconds, each symbol repeats at intervals of 2½ seconds or every 25 FFT's. In order to compensate for the effects of burst errors and the like, the SNR's $R_1$ through $R_{150}$ are combined by adding corresponding values of the repeating messages to obtain 25 combined SNR values $SNR_n$, n=1, 2 . . . 25, as follows:

$$SNR_n = \sum_{i=0}^{5} R_{n+25i}$$

Accordingly, if a burst error should result in the loss of a signal interval i, only one of the six message intervals will have been lost, and the essential characteristics of the combined SNR values are likely to be unaffected by this event.

Once the combined SNR values have been determined, the decoder detects the position of the marker symbol's peak as indicated by the combined SNR values and derives the data symbol sequence based on the marker's position and the peak values of the data symbols.

Once the message has thus been formed, as indicated in steps 182 and 183, the message is logged. However, unlike the embodiment of FIG. 8 the buffer is not cleared. Instead, the decoder loads a further set of SNR's in the buffer and continues to search for a message.

As in the decoder of FIG. 8, it will be apparent from the foregoing to modify the decoder of FIG. 10 for different message structures, message timings, signal paths, detection modes, etc., without departing from the scope of the present invention. For example, the buffer of the FIG. 10 embodiment may be replaced by any other suitable storage device; the size of the buffer may be varied; the size of the SNR values windows may be varied; and/or the symbol repetition time may vary. Also, instead of calculating and storing signal SNR's to represent the respective symbol values, a measure of each symbol's value relative to the other possible symbols, for example, a ranking of each possible symbol's magnitude, is instead used in certain advantageous embodiments.

In a further variation which is especially useful in audience measurement applications, a relatively large number of message intervals are separately stored to permit a retrospective analysis of their contents to detect a channel change. In another embodiment, multiple buffers are employed, each accumulating data for a different number of intervals for use in the decoding method of FIG. 8. For example, one buffer could store a single message interval, another two accumulated intervals, a third four intervals and a fourth eight intervals. Separate detections based on the contents of each buffer are then used to detect a channel change.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A system for decoding a predetermined message symbol of a plurality of message symbols embedded in an audio signal, comprising:

means for receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

means for accumulating a first signal value of the first code symbol representing the predetermined message symbol and a second signal value of the second code symbol representing the predetermined message symbol; and means for examining the accumulated first and second signal values to detect the predetermined message symbol represented by the first and second code symbols.

2. The system of claim 1, wherein the accumulating means is operative to produce a third signal value derived from the first and second signal values and the examining means is operative to detect the predetermined message symbol based on the third signal value.

3. The system of claim 2, wherein the accumulating means is operative to produce the third signal value by linearly combining the first and second signal values.

4. The system of claim 2, wherein the accumulating means is operative to produce the third signal value as a non-linear function of the first and second signal values.

5. The system of claim 1, wherein the accumulating means is operative to store the first and second signal values, and the examining means is operative to detect the predetermined message symbol by examining both of the first and second signal values.

6. The system of claim 1, wherein the receiving means comprises an acoustic transducer for transducing an acoustic audio signal to an electrical signal, the acoustic audio signal having a plurality of code symbols representing a plurality of message symbols comprising source data for the acoustic audio signal, and further comprising a memory for storing indications of detected message symbols.

7. The system of claim 5, further comprising a housing for the system adapted to be carried on the person of an audience member and means for transmitting the stored data for use in producing audience estimates.

8. A method for decoding a predetermined message symbol of a plurality of message symbols incorporated in an audio signal, comprising:

receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

accumulating a first signal value of the first code symbol representing the predetermined message symbol and a second signal value of the second code symbol representing the predetermined message symbol; and examining the accumulated first and second signal values to detect the predetermined message symbol.

9. The method of claim 8, further comprising receiving the first and second code symbols by transducing an acoustic audio signal to an electrical signal, the acoustic audio signal having a plurality of message symbols comprising source data for the acoustic audio signal, and storing data representing indications of detected message symbols.

10. The method of claim 9, further comprising transmitting the stored data for use in producing audience estimates.

11. A system for decoding a predetermined message symbol of a plurality of message symbols incorporated in an audio signal, comprising:

an input device for an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols; and a digital processor in communication with the input device to receive the audio signal therefrom, the digital processor being programmed to accumulate a first signal value representing the first code symbol and a second signal value representing the second code symbol, the digital processor being further programmed to examine the accumulated first and second signal values to detect the predetermined message symbol.

12. The system of claim 11, wherein the input device comprises an acoustic transducer for transducing an acoustic signal to an electrical signal, the acoustic audio signal having a plurality of code symbols representing a plurality of message symbols comprising source data for the acoustic audio signal, the digital processor having a memory for storing data representing indications of detected message symbols.

13. The system of claim 12, further comprising a housing for the system adapted to be carried on the person of an audience member and means for transmitting the stored data for use in producing audience estimates.

14. A system for decoding a predetermined message symbol of a plurality of message symbols embedded in an audio signal, comprising:

means for receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols, the first and second code symbols each comprising a predetermined number of frequency components;

means for producing first and second sets of component values, each set corresponding to a respective one of the first and second code symbols and each component value of each set representing a characteristic of a respective frequency component of the corresponding symbol;

means for accumulating a first signal value of the first code symbol representing the predetermined message symbol based on the first set of component values and a second signal value of the second code symbol representing the predetermined message symbol based on the second set of component values; and means for examining the accumulated first and second signal values to detect the predetermined message symbol represented by the first and second code symbols.

15. A method for decoding a predetermined message symbol of a plurality of message symbols incorporated in an audio signal, comprising:

receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols, the first and second code symbols each comprising a predetermined number of frequency components;

producing first and second sets of component values, each set corresponding to a respective one of the first and second code symbols and each component value of each set representing a characteristic of a respective frequency component of the corresponding symbol;

accumulating a first signal value of the first code symbol representing the predetermined message symbol based on the first set of component values and a second signal value of the second code symbol representing the predetermined message symbol based on the second set of component values; and examining the accumulated first and second signal values to detect the predetermined message symbol.

16. A system for decoding a predetermined message symbol of a plurality of message symbols incorporated in an audio signal, comprising:

an input device for an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols, the first and second code symbols each comprising a predetermined number of frequency components; and a digital processor in communication with the input device to receive the audio signal therefrom, the digital processor being programmed to produce first and second sets of component values, each set corresponding to a respective one of the first and second code symbols and each component value of each set representing a characteristic of a respective frequency component of the corresponding symbol the digital processor being further programmed to produce a first signal value based on the first set of component values and a second signal value based on the second set of component values and to accumulate a first signal value representing the first code symbol and a second signal value representing the second code symbol, the digital processor being further programmed to examine the accumulated first and second signal values to detect the predetermined message symbol.

17. A system for decoding predetermined message symbols of a plurality of message symbols embedded in an audio signal, comprising:

means for receiving an audio signal in which a plurality of message symbols have been incorporated so that the message symbols are inaudible when the audio signal is reproduced audibly, the plurality of message symbols being represented by plural sets of first and second code symbols, each set representing a respective one of the plurality of message symbols, the plural sets of first and second code symbols being arranged as a message having a predetermined sequence including at least one marker symbol and at least one data symbol, at least one of the marker symbol and the data symbol being represented by first and second code symbols incorporated in and displaced in time in the audio signal with at least one code symbol representing a different one of the message symbols being incorporated in the audio signal and positioned in time between the first and second code symbols;

means for accumulating sets of first and second signal values, each signal value set corresponding to a respective one of the sets of first and second code symbols and including a first signal value representing the first code symbol of the respective code symbol set and a second signal value representing the second code symbol thereof; and means for examining the accumulated sets of first and second signal values to detect the presence of the at least one marker symbol based on its signal value set and to detect the at least one data symbol based on the detected presence of the at least one marker symbol and the corresponding signal value set of the at least one data symbol.

18. A method for decoding predetermined message symbols of a plurality of message symbols incorporated in an audio signal, comprising:

receiving an audio signal in which a plurality of message symbols have been incorporated so that the message symbols are inaudible when the audio signal is reproduced audibly, the plurality of message symbols being represented by plural sets of first and second code symbols, each set representing a respective one of the plurality of message symbols, the plural sets of first and second code symbols being arranged as a message having a predetermined sequence including at least one marker symbol and at least one data symbol, at least one of the marker symbol and the data symbol being represented by first and second code symbols incorporated in and displaced in time in the audio signal with at least one code symbol representing a different one of the message symbols being incorporated in the audio signal and positioned in time between the first and second code symbols;

accumulating sets of first and second signal values, each signal value set corresponding to a respective one of the sets of first and second code symbols and including a first signal value representing the first code symbol of the respective code symbol set and a second signal value representing the second code symbol thereof; and examining the accumulated sets of first and second signal values to detect the presence of the marker symbol based on its signal value set and to detect at least one data symbol based on the detected presence of the marker symbol and the corresponding signal value set of the at least one data symbol.

19. A system for decoding predetermined message symbols of a plurality of message symbols incorporated in an audio signal, comprising:

an input device for an audio signal in which a plurality of message symbols have been incorporated so that the message symbols are inaudible when the audio signal is reproduced audibly, the plurality of message symbols being represented by plural sets of first and second code symbols, each set representing a respective one of the plurality of message symbols, the plural sets of first and second code symbols being arranged as a message having a predetermined sequence including at least one marker symbol and at least one data symbol, at least one of the marker symbol and the data symbol being represented by first and second code symbols incorporated in and displaced in time in the audio signal with at least one code symbol representing a different one of the message symbols being incorporated in the audio signal and positioned in time between the first and second code symbols; and a digital processor in communication with the input device to receive the audio signal therefrom, the digital processor being programmed to accumulate sets of first and second signal values, each signal value set corresponding to a respective one of the sets of first and second code symbols and including a first signal value representing the first code symbol of the respective code symbol set and a second signal value representing the second code symbol thereof, the digital processor being further programmed to examine the accumulated sets of first and second signal values to detect the presence of the marker symbol based on its signal value set and to detect at least one data symbol based on the detected presence of the marker symbol and the corresponding signal value set of the at least one data symbol.

20. A system for decoding a predetermined message symbol of a plurality of message symbols embedded in an audio signal, comprising:

means for receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

means for accumulating a first signal value of the first code symbol representing the predetermined message symbol and a second signal value of the second code symbol representing the predetermined message symbol, wherein the accumulating means is operative to produce the first and second signal values based on multiple other signal values; and means for examining the accumulated first and second signal values to detect the predetermined message symbol represented by the first and second code symbols.

21. A method for decoding a predetermined message symbol of a plurality of message symbols incorporated in an audio signal, comprising:

receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

accumulating a first signal value of the first code symbol representing the predetermined message symbol and a second signal value of the second code symbol representing the predetermined message symbol based on multiple other signal values; and examining the accumulated first and second signal values to detect the predetermined message symbol.

22. A system for decoding a predetermined message symbol of a plurality of message symbols incorporated in an audio signal, comprising:

an input device for an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio sign al and positioned in time between the first and second code symbols; and a digital processor in communication with the input device to receive the audio signal therefrom, the digital processor being programmed to accumulate a first signal value representing the first code symbol and a second signal value representing the second code symbol based on multiple other signal values, the digital processor being further programmed to examine the accumulated first and second signal values to detect the predetermined message symbol.

23. A system for decoding a predetermined message symbol of a plurality of message symbols embedded in an audio signal, comprising:

means for receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

means for accumulating a first signal value of the first code symbol representing the predetermined message symbol and a second signal value of the second code symbol representing the predetermined message symbol, wherein the first and second signal values are produced from respective sets of time displaced signal values, each of the time displaced signal values representing a value of a respective one of the first and second code symbols during a corresponding time period thereof; and means for examining the accumulated first and second signal values to detect the predetermined message symbol represented by the first and second code symbols.

24. A method for decoding a predetermined message symbol of a plurality of message symbols incorporated in an audio signal, comprising:

receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

accumulating a first signal value of the first code symbol representing the predetermined message symbol and a second signal value of the second code symbol representing the predetermined message symbol, wherein the first and second signal values are produced from respective sets of time displaced signal values, each of the time displaced signal values representing a value of a respective one of the first and second code symbols during a corresponding time period thereof; and examining the accumulated first and second signal values to detect the predetermined message symbol.

25. A system for decoding a predetermined message symbol of a plurality of message symbols incorporated in an audio signal, comprising:

an input device for an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols; and a digital processor in communication with the input device to receive the audio signal therefrom, the digital processor being programmed to accumulate a first signal value representing the first code symbol and a second signal value representing the second code symbol, wherein the first and second signal values are produced from respective sets of time displaced signal values, each of the time displaced signal values representing a value of a respective one of the first and second code symbols during a corresponding time period thereof, the digital processor being further programmed to examine the accumulated first and second signal values to detect the predetermined message symbol.

26. A system for decoding a predetermined message symbol of a plurality of message symbols embedded in an audio signal, comprising:

means for receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols, the first and second code symbols each comprising a predetermined number of frequency components;

means for producing first and second sets of component values, each set corresponding to a respective one of the first and second code symbols and each component value of each set representing a characteristic of a respective frequency component of the corresponding symbol;

means for accumulating a first signal value of the first code symbol representing the predetermined message symbol based on the first set of component values and a second signal value of the second code symbol representing the predetermined message symbol based on the second set of component values, and for producing a third signal value derived from the first and second signal values; and means for detecting the predetermined message symbol represented by the first and second code symbols based on the third signal value.

27. A system for decoding a message represented by a plurality of message symbols embedded in an audio signal, comprising:

means for receiving an audio signal in which a plurality of message symbols have been incorporated so that the message symbols are inaudible when the audio signal is reproduced audibly, the plurality of message symbols being represented by plural sets of first and second code symbols, each set representing a respective one of the plurality of message symbols, the plural sets of first and second code symbols being arranged as a message having a predetermined sequence including at least one marker symbol and at least one data symbol, at least one of the marker symbol and the data symbol being represented by first and second code symbols incorporated in and displaced in time in the audio signal with at least one code symbol representing a different one of the message symbols being incorporated in the audio signal and positioned in time between the first and second code symbols;

means for accumulating sets of first and second signal values, each signal value set corresponding to a respective one of the sets of first and second code symbols and including a first signal value representing the first code symbol of the respective code symbol set and a second signal value representing the second code symbol thereof and for producing a third signal value derived from the first and second signal values; and means for detecting a respective one of the plurality of message symbols represented by the first and second code symbols based on the third signal value and for detecting the message by detecting the presence of the marker symbol based on its signal value set and detecting at least one data symbol based on the detected presence of the marker symbol and the corresponding signal value set of the at least one data symbol.

28. A system for decoding a predetermined message symbol of a plurality of message symbols embedded in an audio signal, comprising:

means for receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

means for accumulating a first signal value of the first code symbol representing the predetermined message symbol and a second signal value of the second code symbol representing the predetermined message symbol, wherein the accumulating means is operative to produce the first and second signal values based on multiple other signal values and wherein the accumulating means is operative to store the first and second signal values; and means for examining both of the accumulated first and second signal values to detect the predetermined message symbol represented by the first and second code symbols.

29. The system of claim 28, wherein the first and second signal values are produced from respective sets of time displaced signal values, each of the time displaced signal values representing a value of a respective one of the first and second code symbols during a corresponding time period thereof.

30. The system of claim 28, wherein the first and second code symbols each comprise a predetermined number of frequency components, and further comprising means for producing first and second sets of component values, each set corresponding to a respective one of the first and second code symbols and each component value of each set representing a characteristic of a respective frequency component of the corresponding symbol, and means for producing the first signal value based on the first set of component values and producing the second signal value based on the second set of component values.

31. A method for decoding a predetermined message symbol of a plurality of message symbols embedded in an audio signal, comprising:

receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols, the first and second code symbols each comprising a predetermined number of frequency components;

producing first and second sets of component values, each set corresponding to a respective one of the first and second code symbols and each component value of each set representing a characteristic of a respective frequency component of the corresponding symbol;

accumulating a first signal value of the first code symbol representing the predetermined message symbol based on the first set of component values and a second signal value of the second code symbol representing the predetermined message symbol based on the second set of component values, and for producing a third signal value derived from the first and second signal values; and detecting the predetermined message symbol represented by the first and second code symbols based on the third signal value.

32. A method for decoding a message represented by a plurality of message symbols embedded in an audio signal, comprising:

receiving an audio signal in which a plurality of message symbols have been incorporated so that the message symbols are inaudible when the audio signal is reproduced audibly, the plurality of message symbols being represented by plural sets of first and second code symbols, each set representing a respective one of the plurality of message symbols, the plural sets of first and second code symbols being arranged as a message having a predetermined sequence including at least one marker symbol and at least one data symbol, at least one of the marker symbol and the data symbol being represented by first and second code symbols incorporated in and displaced in time in the audio signal with at least one code symbol representing a different one of the message symbols being incorporated in the audio signal and positioned in time between the first and second code symbols;

accumulating sets of first and second signal values, each signal value set corresponding to a respective one of the sets of first and second code symbols and including a first signal value representing the first code symbol of the respective code symbol set and a second signal value representing the second code symbol thereof;

producing a third signal value derived from the first and second signal values;

detecting a respective one of the plurality of message symbols represented by the first and second code symbols based on the third signal value; and detecting the message by detecting the presence of the marker symbol based on its signal value set and detecting at least one data symbol based on the detected presence of the marker symbol and the corresponding signal value set of the at least one data symbol.

33. A method for decoding a predetermined message symbol of a plurality of message symbols embedded in an audio signal, comprising:

receiving an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols;

accumulating a first signal value of the first code symbol representing the predetermined message symbol and a second signal value of the second code symbol representing the predetermined message symbol based on multiple other signal values;

storing the first and second signal values; and examining both of the accumulated first and second signal values to detect the predetermined message symbol represented by the first and second code symbols.

34. The method of claim 33, wherein the first and second signal values are produced from respective sets of time displaced signal values, each of the time displaced signal values representing a value of a respective one of the first and second code symbols during a corresponding time period thereof.

35. The method of claim 33, wherein the first and second code symbols each comprise a predetermined number of frequency components, and further comprising producing first and second sets of component values, each set corresponding to a respective one of the first and second code symbols and each component value of each set representing a characteristic of a respective frequency component of the corresponding symbol, and producing the first signal value based on the first set of component values and producing the second signal value based on the second set of component values.

36. A system for decoding a predetermined message symbol of a plurality of message symbols embedded in an audio signal, comprising:

an input device for an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols, the first and second code symbols each comprising a predetermined number of frequency components;

a digital processor in communication with the input device to receive the audio signal therefrom, the digital processor being programmed to produce first and second sets of component values, each set corresponding to a respective one of the first and second code symbols and each component value of each set representing a characteristic of a respective frequency component of the corresponding symbol, the digital processor being further programmed to accumulate a first signal value of the first code symbol representing the predetermined message symbol based on the first set of component values and a second signal value of the second code symbol representing the predetermined message symbol based on the second set of component values, to produce a third signal value derived from the first and second signal values, and to detect the predetermined message symbol represented by the first and second code symbols based on the third signal value.

37. A system for decoding a message represented by a plurality of message symbols embedded in an audio signal, comprising:

an input device for an audio signal in which a plurality of message symbols have been incorporated so that the message symbols are inaudible when the audio signal is reproduced audibly, the plurality of message symbols being represented by plural sets of first and second code symbols, each set representing a respective one of the plurality of message symbols, the plural sets of first and second code symbols being arranged as a message having a predetermined sequence including at least one marker symbol and at least one data symbol, at least one of the marker symbol and the data symbol being represented by first and second code symbols incorporated in and displaced in time in the audio signal with at least one code symbol representing a different one of the message symbols being incorporated in the audio signal and positioned in time between the first and second code symbols; and a digital processor in communication with the input device to receive the audio signal therefrom, the digital processor being programmed to accumulate sets of first and second signal values, each signal value set corresponding to a respective one of the sets of first and second code symbols and including a first signal value representing the first code symbol of the respective code symbol set and a second signal value representing the second code symbol thereof, the digital processor being further programmed to produce a third signal value derived from the first and second signal values, to detect a respective one of the plurality of message symbols represented by the first and second code symbols based on the third signal value, and to detect the message by detecting the presence of the marker symbol based on its signal value set and detecting at least one data symbol based on the detected presence of the marker symbol and the corresponding signal value set of the at least one data symbol.

38. A system for decoding a predetermined message symbol of a plurality of message symbols embedded in an audio signal, comprising:

an input device for an audio signal in which a plurality of message symbols have been incorporated so that the message symbols are inaudible when the audio signal is reproduced audibly, the plurality of message symbols being contained within a predetermined message as a plurality of code symbols, the predetermined message symbol being represented by first and second code symbols incorporated in and displaced in time in the audio signal with at least one code symbol representing a different one of the message symbols being incorporated in the audio signal and positioned in time between the first and second code symbols; and a digital processor in communication with the input device to receive the audio signal therefrom, the digital processor being programmed to accumulate a first signal value of the first code symbol representing the predetermined message symbol and a second signal value of the second code symbol representing the predetermined message symbol based on multiple other signal values, to store the first and second signal values, and to examine both of the accumulated first and second signal values to detect the predetermined message symbol represented by the first and second code symbols.

39. The system of claim 38, wherein the first and second signal values are produced from respective sets of time displaced signal values, each of the time displaced signal values representing a value of a respective one of the first and second code symbols during a corresponding time period thereof.

40. The system of claim 38, wherein the first and second code symbols each comprise a predetermined number of frequency components, and wherein the digital processor is programmed to produce first and second sets of component values, each set corresponding to a respective one of the first and second code symbols and each component value of each set representing a characteristic of a respective frequency component of the corresponding symbol, and the digital processor is further programmed to produce the first signal value based on the first set of component values and to produce the second signal value based on the second set of component values.

* * * * *